United States Patent
Kimura

(10) Patent No.: US 9,597,707 B2
(45) Date of Patent: Mar. 21, 2017

(54) MANUFACTURING METHOD FOR MULTILAYER LAMINATED FILM

(71) Applicant: Konica Minolta, Inc., Tokyo (JP)

(72) Inventor: Akiyoshi Kimura, Tokyo (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

(21) Appl. No.: 14/400,970

(22) PCT Filed: May 16, 2013

(86) PCT No.: PCT/JP2013/063670
§ 371 (c)(1),
(2) Date: Nov. 13, 2014

(87) PCT Pub. No.: WO2013/172415
PCT Pub. Date: Nov. 21, 2013

(65) Prior Publication Data
US 2015/0132499 A1  May 14, 2015

(30) Foreign Application Priority Data

May 18, 2012 (JP) ................................. 2012-114826

(51) Int. Cl.
| | | |
|---|---|---|
| B05D 1/00 | (2006.01) | |
| B05D 1/26 | (2006.01) | |
| B05D 1/34 | (2006.01) | |
| B05D 1/36 | (2006.01) | |
| B05D 1/30 | (2006.01) | |
| B05D 7/00 | (2006.01) | |
| G02B 1/11 | (2015.01) | |
| G02B 5/28 | (2006.01) | |

(52) U.S. Cl.
CPC ............... *B05D 1/36* (2013.01); *B05D 1/00* (2013.01); *B05D 1/26* (2013.01); *B05D 1/265* (2013.01); *B05D 1/30* (2013.01); *B05D 1/34* (2013.01); *B05D 7/50* (2013.01); *G02B 1/11* (2013.01); *G02B 5/282* (2013.01)

(58) Field of Classification Search
CPC . B05D 1/00; B05D 1/26; B05D 1/265; B05D 1/30; B05D 1/34; B05D 1/36; B05D 7/50; G02B 1/11; G02B 1/111; G02B 1/115; G02B 5/281; G02B 5/282

USPC ............... 427/162, 163.4, 407.1, 420
See application file for complete search history.

(56) References Cited

U.S. PATENT DOCUMENTS

| | | | | |
|---|---|---|---|---|
| 3,218,183 A | * | 11/1965 | Fritzsching | ............ D21H 19/12 |
| | | | | 427/158 |
| 4,113,903 A | * | 9/1978 | Choinski | ................. B05C 5/007 |
| | | | | 118/410 |
| 4,572,849 A | * | 2/1986 | Koepke | ................... B05C 5/007 |
| | | | | 118/325 |

FOREIGN PATENT DOCUMENTS

| | | |
|---|---|---|
| JP | 541350 | 1/1979 |
| JP | 02-253878 A | 10/1990 |
| JP | 04-271016 A | 9/1992 |
| JP | 09-146217 A | 6/1997 |
| JP | 10-328613 A | 12/1998 |
| JP | 2002-254022 A | 9/2002 |
| JP | 2010-082653 A | 4/2010 |
| JP | 2010-181801 A | 8/2010 |

OTHER PUBLICATIONS

International Preliminary Report on Patentability dated Nov. 27, 2014 cited in corresponding PCT International Application No. PCT/JP2013/063670.

* cited by examiner

*Primary Examiner* — William Phillip Fletcher, III
(74) *Attorney, Agent, or Firm* — Lucas & Mercanti, LLP

(57) ABSTRACT

Provided is a manufacturing method for a multilayer laminated film at a high coating rate, whereby film thickness uniformity is improved and interference unevenness is reduced. The present invention is a manufacturing method for a multilayer laminated film, the method including the step of simultaneous multilayer coating of plural coating liquids onto a substrate at a coating rate of 10 m/min or more, wherein, when A [mPa·s] stands for the viscosity of the coating liquid at a temperature of 45° C. and a shear rate of 10 $\sec^{-1}$, B [mPa·s] stands for the viscosity of the coating liquid at a temperature of 45° C. and a shear rate of 1000 $\sec^{-1}$, and C [mPa·s] stands for the viscosity of the coating liquid at a temperature of 45° C. and a shear rate of 10000 $\sec^{-1}$, at least one coating liquid of the plural coating liquids has A/B in the range of 1.5 to 9 and B/C in the range of 0.6 to 1.4.

2 Claims, No Drawings

MANUFACTURING METHOD FOR MULTILAYER LAMINATED FILM

CROSS REFERENCE TO RELATED APPLICATION

This Application is a 371 of PCT/JP2013/063670 filed on May 16, 2013 which, in turn, claimed the priority of Japanese Patent Application No. JP2012-114826 filed on May 18, 2012, both applications are incorporated herein by reference.

TECHNICAL FIELD

The present invention relates to a manufacturing method for a multilayer laminated film.

BACKGROUND ART

Multilayer laminated films, which are manufactured by laminating a high refractive index layer and a low refractive index layer, such as an antireflection film and an infrared reflective film, have been conventionally manufactured by dry deposition or wet deposition.

In terms of productivity, wet deposition, in which coating liquids are coated and dried, is more excellent than dry deposition such as chemical vapor deposition (CVD) and physical vapor deposition (PVD). An optical interference layer has been, for example, suggested, which uses a transparent high refractive index coat which includes metal oxide fine particles and an organic polymer e.g. a thermosetting type, and has high antireflection performance. When an optical film is manufactured by wet deposition, however, in order to uniform film thickness, the physical properties of a coating liquid are required to be strictly controlled. As a technique to control the viscosity of a coating liquid, for example, it has been suggested that an antireflection film is manufactured by controlling the viscosity of a coating liquid at 25° C. to 20 mPa·s or less and using the coating liquid whose thixotropic properties are lowered in the low shear region (see Japanese Patent Application Laid-Open No. 2010-181801). It has been also suggested that an optical film is manufactured by simultaneous multilayer coating in which coating liquids, in which rheopectic properties are imparted to organic solvent coating liquids, are multi-stratified beforehand on an inclined slide surface and the obtained laminate is coated onto a substrate (see Japanese Patent Application Laid-Open No. 2010-8265563). It has been further suggested that in simultaneous multilayer coating, coating is carried out using a coating liquid directly touching a substrate, which has a viscosity of 10 mPa·s or less in the high shear region as its physical properties (see Japanese Patent Application Laid-Open No. S54-1350).

SUMMARY OF INVENTION

In the manufacturing methods described in the above-mentioned Patent Literatures, however, it was found that, when a multilayer laminated film was manufactured using simultaneous multilayer coating, an increase in the coating rate to 10 m/min or more caused the problem that the film thickness of each layer suddenly becomes nonuniform and the desired optical performance was not fulfilled. An infrared shielding film and an antireflection film are required that a large number of high refractive index layers and low refractive index layers be laminated. The simultaneous multilayer coating is thus an effective technique; however, when the film thicknesses of high refractive index layers and low refractive index layers become nonuniform, interference becomes nonuniform and color unevenness by visual inspection occurs, which is not suitable for practical use.

Thus, an object of the present invention is to provide a manufacturing method for a multilayer laminated film at a high coating rate by which film thickness uniformity is improved and interference unevenness is reduced.

The present inventors diligently investigated in view of the above-mentioned problem. As a result, surprisingly, it is found that in simultaneous multilayer coating using plural coating liquids, when A [mPa·s] stands for the viscosity of a coating liquid at a temperature of 45° C. and a shear rate of 10 $\text{sec}^{-1}$, B [mPa·s] stands for the viscosity of the coating liquid at a temperature of 45° C. and a shear rate of 1000 $\text{sec}^{-1}$, and C [mPa·s] stands for the viscosity of the coating liquid at a temperature of 45° C. and a shear rate of 10000 $\text{sec}^{-1}$, the above-mentioned problem was solved by using at least one coating liquid having A/B and B/C in specific value ranges, thereby completing the present invention.

That is, the present invention is a manufacturing method for a multilayer laminated film, the method including the step of simultaneous multilayer coating of plural coating liquids onto a substrate at a coating rate of 10 m/min or more, wherein, when A [mPa·s] stands for the viscosity of the coating liquid at a temperature of 45° C. and a shear rate of 10 $\text{sec}^{-1}$, B [mPa·s] stands for the viscosity of the coating liquid at a temperature of 45° C. and a shear rate of 1000 $\text{sec}^{-1}$, and C [mPa·s] stands for the viscosity of the coating liquid at a temperature of 45° C. and a shear rate of 10000 $\text{sec}^{-1}$, at least one coating liquid of the above plural coating liquids has A/B in the range of 1.5 to 9 and B/C in the range of 0.6 to 1.4.

DESCRIPTION OF EMBODIMENTS

The present invention is a manufacturing method for a multilayer laminated film, the method including the step of simultaneous multilayer coating of plural coating liquids onto a substrate at a coating rate of 10 m/min or more, wherein, when A [mPa·s] stands for the viscosity of the coating liquid at a temperature of 45° C. and a shear rate of 10 $\text{sec}^{-1}$, B [mPa·s] stands for the viscosity of the coating liquid at a temperature of 45° C. and a shear rate of 1000 $\text{sec}^{-1}$, and C [mPa·s] stands for the viscosity of the coating liquid at a temperature of 45° C. and a shear rate of 10000 $\text{sec}^{-1}$, at least one coating liquid of the above plural coating liquids has A/B in the range of 1.5 to 9 and B/C in the range of 0.6 to 1.4. By such manufacturing method, a multilayer laminated film in which film thickness uniformity is improved and interference unevenness is reduced can be manufactured at a high coating rate.

A detailed reason why film thickness uniformity of a multilayer laminated film is improved by the manufacturing method of the present invention has been unclear, however, the following reasons are conjectured.

In order to prevent respective layers from being mixed because of shocks when a coating liquid comes into contact with a substrate and not to undergo irreversible transformation, large changes in the viscosity of a coating liquid in the low shear region are required. In addition, it is believed that when coating liquids are coated onto a substrate by simultaneous multilayer coating, because the undermost layer and the uppermost layer have different stretching rates, the viscosity balance between layers is disrupted, and the film thickness of each layer becomes nonuniform at the time of a return to the viscosity before stretching after coating. That is, small changes in the viscosity of a coating liquid in the high shear region are required in order to uniform film thickness.

On the viscosity of a coating liquid defined in the present invention, the above-mentioned A, B and C are assumed to be, respectively, the viscosity when a coating liquid is statically placed, the viscosity when a coating liquid is coated onto a substrate, and the viscosity when a coating liquid is coated and then stretched by a coater. The ratio of these viscosity in a specific range, i.e. A/B=1.5 to 9, means that changes in the viscosity of a coating liquid in the low shear region are large, and B/C=0.6 to 1.4 means that changes in the viscosity of a coating liquid in the high shear region are small. Therefore, according to the manufacturing method of the present invention including the step of simultaneous multilayer coating using a coating liquid(s) having the viscosity characteristics as mentioned above, a multilayer laminated film in which film thickness uniformity is improved and interference unevenness is reduced can be obtained.

The above-mentioned mechanism is based on conjecture and the present invention is not limited to the above-mentioned mechanism.

The viscosity of a coating liquid used in the present invention can be measured by a precision rotational viscometer such as RS6000 or RotoVisco (all manufactured by HAAKE). For example, viscosity can be measured by a method in which viscosity is monitored while increasing the number of rotations from 10 sec$^{-1}$ to 10000 sec$^{-1}$, and the like. In the present invention, A/B and C/D indicate changes in the viscosity from 10 sec$^{-1}$ to 1000 sec$^{-1}$ and changes in the viscosity from 1000 sec$^{-1}$ to 10000 sec$^{-1}$, respectively, and their value closer to 1 means that changes in the viscosity of a coating liquid in a region are small.

When the above-mentioned A/B is lower than 1.5, the mixing of a high refractive index layer and a low refractive index layer occurs in simultaneous multilayer coating. On the other hand, when the A/B is above 9, troubles in the form of thread can occur on a coated film. The A/B is preferably 1.6 to 6 and more preferably 2 to 5.

In addition, the above-mentioned B/C is lower than 0.6 or above 1.4, film thickness becomes nonuniform. The B/C is preferably 0.9 to 1.2 and more preferably 1 to 1.1.

As the value ranges of the above-mentioned A/B and B/C, at least one coating liquid of plural coating liquids used for simultaneous multilayer coating only needs to fulfill the above-mentioned value ranges. In the preferred mode, all of plural coating liquids to be used fulfill the above-mentioned value ranges.

Furthermore, the viscosity of at least one coating liquid of the above plural coating liquids at a temperature of 45° C. and a shear rate of 100 sec$^{-1}$ is preferably below 20 mPa·s and more preferably 15 mPa·s or less. The viscosity at a shear rate of 100 sec$^{-1}$ is assumed to be the viscosity when a coating liquid returns to a stationary state after the coating liquid is coated onto a substrate. When the viscosity is in the above-mentioned range, film thickness uniformity is more improved. In the more preferred mode, all of plural coating liquids to be used fulfill the above-mentioned value ranges.

The manufacturing method for a multilayer laminated film of the present invention will be now described in detail.

[Multilayer Laminated Film]

The constitution of the multilayer laminated film according to the present invention is not particularly limited, and preferably includes a substrate and at least one unit composed of a high refractive index layer and a low refractive index layer, and more preferably has the form of an alternate laminate in which a high refractive index layer and a low refractive index layer are alternately laminated. In the present description, a refractive index layer having a higher refractive index than that of another refractive index layer is referred to as a high refractive index layer and a refractive index layer having a lower refractive index than that of another refractive index layer is referred to as a low refractive index layer.

The type of multilayer laminated film to which the manufacturing method of the present invention is applied is not particularly limited, and examples thereof include an antireflection film, an infrared shielding film, an electromagnetic shielding film and the like. Among these, an infrared shielding film having a number of laminated layers is preferred. The constitution of the multilayer laminated film according to the present invention will now be described in more detail using an infrared shielding film as an example.

In the present invention, it is preferred that an infrared shielding film include at least one unit composed of two layers having different refractive indexes, i.e. a high refractive index layer and a low refractive index layer. When a high refractive index layer and a low refractive index layer each include metal oxide particles, for example, metal oxide particles contained in the low refractive index layer (hereinafter, referred to as "the first metal oxide particles") and metal oxide particles contained in the high refractive index layer (hereinafter, referred to as "the second metal oxide particles") are mixed on the interface of two layers and a layer containing the first metal oxide particles and the second metal oxide particles can be formed. In this case, the layer is regarded as a low refractive index layer or a high refractive index layer depending on the abundance ratio of the first metal oxide particles and the second metal oxide particles. Specifically, the low refractive index layer means a layer containing 50 to 100% by mass of the first metal oxide particles with respect to the total mass of the first metal oxide particles and the second metal oxide particles. The high refractive index layer means a layer containing above 50% by mass and 100% by mass or less of the second metal oxide particles with respect to the total mass of the first metal oxide particles and the second metal oxide particles. The type and amount of metal oxide particles contained in a refractive index layer can be analyzed by energy dispersive X-ray spectroscopy (EDX).

In general, an infrared shielding film is preferably designed so that a difference in refractive index between a low refractive index layer and a high refractive index layer will be large, from the viewpoint that an infrared refractive index can be raised using a small number of layers. In the infrared shielding film according to the present invention, in at least one unit composed of a low refractive index layer and a high refractive index layer, a difference in refractive index between the low refractive index layer and the high refractive index layer adjacent thereto is preferably 0.1 or more, more preferably 0.3 or more, further preferably 0.35 or more and particularly preferably 0.4 or more. When an infrared reflective film has plural units of a high refractive index layer and a low refractive index layer, it is preferred that a difference in refractive index between a high refractive index layer and a low refractive index layer be in the above-mentioned suitable range in all units. The outermost layer and the undermost layer, however, may have the constitution beyond the above-mentioned suitable range. In addition, in the infrared reflective film in the present embodiment, the refractive index of a low refractive index layer is preferably 1.10 to 1.60 and more preferably 1.30 to 1.50. In addition, the refractive index of a high refractive index layer is preferably 1.80 to 2.50 and more preferably 1.90 to 2.20.

In the present invention, the refractive index of a high refractive index layer and a low refractive index layer can be obtained according to the following method.

A sample, in which a single layer of each refractive index layer, whose refractive index is measured, is painted onto a substrate, is produced, and this sample is cut into 10 cm×10 cm, and then, a refractive index is obtained according to the following method. As a spectrophotometer, U-4000 model (manufactured by Hitachi, Ltd.) is used. The back of the measuring side of each sample is subjected to roughening and then subjected to light absorption treatment using a black spray to prevent light reflection on the back. The reflectance in the visible light region (400 nm to 700 nm) is measured at 25 points under conditions of 5° specular reflection and the average value is obtained. Using the measurement results, the average refractive index is obtained.

The reflectance in a specific wavelength region is decided by a difference in refractive index between adjacent two layers and the number of laminated layers. As a greater difference in refractive index, the same reflectance can be obtained by the fewer number of layers. This difference in refractive index and the required number of layers can be calculated using commercially available optical design software. In order to obtain an infrared reflectance of 90% or more, for example, when a difference in refractive index is smaller than 0.1, 200 or more layer lamination is required. Therefore, not only the productivity declines, but also scattering on the interface of laminated layers becomes large to decrease transparency, and also manufacturing becomes very difficult without troubles. The difference in refractive index does not have the upper limit in terms of improvement of the refractive index and reduction in the number of layers, but the limit is substantially approximately 1.4.

In the infrared shielding film according to the present invention, the number of high refractive index layers and low refractive index layers is preferably 100 layers or less, i.e. 50 units or less, more preferably 40 layers (20 units) or less, and further preferably 30 layers (15 units) or less as the range of the total number of layers from the above viewpoint. In addition, the infrared reflective film of the present invention only needs to have the constitution in which at least one of the above-mentioned unit is laminated and, for example, can be a laminated film whose both outermost layer and undermost layer are either a high refractive index layer or a low refractive index layer. The infrared reflective film according to the present invention preferably has the layer constitution in which the undermost layer adjacent to a substrate is a low refractive index layer and the outermost layer is also a low refractive index layer.

The whole thickness of the infrared shielding film according to the present invention is preferably 12 μm to 315 μm, more preferably 15 μm to 200 μm and further preferably 20 μm to 100 μm. In addition, the thickness per low refractive index layer is preferably 20 to 800 nm and more preferably 50 to 350 nm. On the other hand, the thickness per high refractive index layer is preferably 20 to 800 nm and more preferably 50 to 350 nm.

Further, as the optical characteristics of the infrared shielding film according to the present invention, the transmittance in the visible light region shown by JIS R3106: 1998 is preferably 50% or more, more preferably 75% or more and further preferably 85% or more, and it is also preferred that the film have a region with a reflectance of above 50% in a wavelength region of 900 nm to 1400 nm.

The infrared shielding film according to the present invention can have one or more functional layers such as a conductive layer, an antistatic layer, a gas barrier layer, an easy-bonding layer (bonding layer), an antifouling layer, a deodorant layer, a droplet flowing layer, an easily slipping layer, a hard-coated layer, an abrasion resistance layer, an antireflection layer, an electromagnetic shielding layer, an ultraviolet absorbing layer, an infrared absorbing layer, a printed layer, a fluorescent emission layer, a hologram layer, a release layer, an adhesive layer, a bonding layer, an infrared cut layer other than the high refractive index layer and the low refractive index layer of the present invention (a metal layer and a liquid crystal layer), a colored layer (a visible light absorbing layer) and an intermediate film layer used for a laminated glass, under a substrate or onto the outermost surface layer on the opposite side of the substrate for the purpose of adding further functions.

The basic constitution of a high refractive index layer and a low refractive index layer in the infrared shielding film according to the present invention will now be described.

[Manufacturing Method for Infrared Shielding Film]

The coating liquids used in the present invention are coated by simultaneous multilayer coating. A coating liquid for a high refractive index and a coating liquid for a low refractive index are laminated on a slide and the obtained laminate is coated onto a substrate to form a high refractive index layer and a low refractive index layer.

More specifically, it is preferred that the manufacturing method for an infrared shielding film according to the present invention include the step of laminating a low refractive index layer coating liquid, which includes the first metal oxide particles contained in a low refractive index layer, the first water-soluble resin and an aqueous solvent, and a high refractive index layer coating liquid, which includes the second metal oxide particles contained in a high refractive index layer, the second water-soluble resin and an aqueous solvent, on a slide and coating the obtained laminate onto a substrate, and the step of drying the above substrate onto which coating liquids are coated.

(Preparing Method for Coating Liquid)

Herein, the preparing method for a high refractive index layer coating liquid and a low refractive index layer coating liquid will be described.

The preparing method for a high refractive index layer coating liquid and a low refractive index layer coating liquid is not particularly limited, and, for example, includes a method in which metal oxide particles, a water-soluble resin and other additives to be added as required are added and the obtained mixture is stirred and mixed. In this case, the order of addition of each component is also not particularly limited, and each component can be sequentially added while stirring and mixed, or can be simultaneously added while stirring and mixed. As required, a solvent is further used to prepare appropriate viscosity.

The solvent to prepare a high refractive index layer coating liquid and a low refractive index layer coating liquid is not particularly limited, and is preferably water, an organic solvent or a mixed solvent thereof.

Examples of the above organic solvents include alcohols such as methanol, ethanol, 2-propanol and 1-butanol, esters such as ethyl acetate, butyl acetate, propylene glycol monomethyl ether acetate and propylene glycol monoethyl ether acetate, ethers such as diethyl ether, propylene glycol monomethyl ether and ethylene glycol monoethyl ether, amides such as dimethylformamide and N-methylpyrrolidone, ketones such as acetone, methylethylketone, acetylacetone and cyclohexanone, and the like. These organic solvents can be used singly or two or more organic solvents can be used in combination.

It is particularly preferred that the solvent for a coating liquid be water or a mixed solvent of water and methanol, ethanol or ethyl acetate in terms of environments, ease of handling and the like.

As the second metal oxide particles used for a high refractive index layer coating liquid, those separately prepared in a state of dispersion are preferably used before preparing a coating liquid. That is, a high refractive index layer is preferably formed using an aqueous high refractive index layer coating liquid which is prepared by adding and dispersing rutile type titanium dioxide with a volume average particle diameter of 100 nm or less. Further, a high refractive index layer is more preferably formed using an aqueous high refractive index layer coating liquid which is prepared by adding and dispersing titanium dioxide particles covered with silicon-containing hydrated oxide. When a dispersion is used, the dispersion can be properly added so that any concentration will be obtained in each layer.

As the first metal oxide particles used for a low refractive index layer coating liquid, silicon dioxide particles are preferably used, and an acidic colloidal silica sol is more preferably used.

In the present invention, as a low refractive index layer coating liquid and a high refractive index layer coating liquid, an aqueous coating liquid including a water-soluble resin such as polyvinyl alcohols and water or an aqueous solvent including water and a water-soluble organic solvent is preferably used because mixing of layers can be inhibited by setting a coating film after coating.

The solid content concentration in a coating liquid is preferably 0.1 to 10% by mass, and more preferably 0.1 to 5% by mass. In this range, the solid content is low and coating liquid uniformity is high, and thus it is believed that film thickness uniformity is more improved.

The water-soluble resin concentration in a high refractive index layer coating liquid is preferably 0.5 to 10% by mass. In addition, the second metal oxide particle concentration in a high refractive index layer coating liquid is preferably 1 to 50% by mass.

The water-soluble resin concentration in a low refractive index layer coating liquid is preferably 0.1 to 10% by mass. In addition, the first metal oxide particle concentration in a low refractive index layer coating liquid is preferably 1 to 50% by mass.

In the coating liquids used in the present invention, their viscosity behaviors to the shear rate as described above are required to be adjusted, and for this adjustment, a viscosity modifier and a thixotropic property imparting agent which are conventionally used can be used.

As specific examples of viscosity modifiers and thixotropic property imparting agents, for example, synthetic polymers such as hydroxypropylmethylcellulose (HPMC), carboxymethylcellulose (CMC), methylcellulose (MC), carrageenan, xanthan gum, guar gum, sodium polyacrylate, polyacrylic acid, cross-linked sodium polyacrylate and cross-linked acrylic acid can be properly selected and used. In addition, in the present invention, a coating liquid may contain a water-soluble resin and metal oxide particles, and in this case, the metal oxide particles impart the thixotropic properties. When the above-described viscosity ratio becomes high, the viscosity behavior of a coating liquid can be properly adjusted using a dispersant. The thixotropic properties (viscosity ratio) can be adjusted to the desired range by selecting an appropriate dispersant.

As specific examples of viscosity modifiers and thixotropic property imparting agents, for example, anionic dispersants such as a polycarboxylic acid dispersant, an alkyl sulfonic acid dispersant, a polyphosphate dispersant and carboxyl-modified polyvinyl alcohol, cationic dispersants such as a polyalkylene polyamine dispersant, a quaternary ammonium dispersant and an alkyl polyamine dispersant, and nonionic dispersants such as a polyethylene glycol dispersant, a higher alcohol alkylene oxide dispersant and modified polyvinyl alcohol such as short chain polyvinyl alcohol, silane modified polyvinyl alcohol and amide modified polyvinyl alcohol, and the like can be used.

The amounts of these viscosity modifier and thixotropic property imparting agent added are preferably 1 to 20% by mass and more preferably 1 to 10% by mass with respect to metal oxide particles. The viscosity ratio can be adjusted to the desired value by adding these viscosity modifier and thixotropic property imparting agent.

The above viscosity modifiers and the above thixotropic property imparting agents can be used singly or two or more of them can be used in combination. As the above viscosity modifier and the above thixotropic property imparting agent, commercial products can be used or synthetic products can be used. Examples of commercial products include, for example, SN DISPERSANT 5020, NOPCO 38-C (all manufactured by SAN NOPCO LIMITED.), AT-17, AP-17, AF-17 (carboxyl-modified PVA, all manufactured by JAPAN VAM & POVAL CO., LTD.), R1130, R2105, R2130 (silane-modified PVA, all manufactured by KURARAY CO., LTD.) and the like.

Further, in order to increase viscosity changes in the low shear region from 10 to 1000 $sec^{-1}$ and decrease viscosity changes in the high shear region from 1000 to 10000 $sec^{-1}$, an increase in the molecular weight of a water-soluble resin in a coating liquid is also effective. In this case, a water-soluble resin having a weight average molecular weight of 100000 to 600000 is preferably used, and a water-soluble resin having a weight average molecular weight of 150000 to 450000 is more preferably used. The content of a water-soluble resin having a weight average molecular weight in such range is preferably 1 to 5% by mass and more preferably 1 to 3% by mass with respect to the total mass of coating liquid. The weight average molecular weight of a water-soluble resin can be measured by gel permeation chromatography (GPC).

The coating method for coating liquids is not particularly limited as long as a simultaneous multilayer coating method is used, and, for example, a slide bead coating method and an extrusion coating method using a hopper, described in U.S. Pat. No. 2,761,419, U.S. Pat. No. 2,761,791 and the like, and the like are preferably used.

In the case of simultaneous multilayer coating, the coating and drying method is preferably a method in which a high refractive index layer coating liquid and a low refractive index layer coating liquid are heated to 30 to 60° C., followed by simultaneous multilayer coating of the high refractive index layer coating liquid and the low refractive index layer coating liquid onto a substrate and the temperature of the formed coating film is then temporarily cooled to, preferably, 1 to 15° C. (set), followed by drying at 10° C. or more. The drying conditions are more preferably the conditions of a wet bulb temperature at 5 to 50° C. and a film surface temperature at 10 to 50° C. For example, drying is carried out by blowing 80° C. hot air for 1 to 5 seconds. In addition, as a cooling method immediately after coating, a horizontal set method is preferably used in terms of improvement in the uniformity of the formed coating film.

In the manufacturing method of the present invention, the coating rate is 10 m/min or more and preferably 30 m/min or more. According to the manufacturing method of the present invention, a multilayer laminated film in which film thickness uniformity is improved and interference unevenness is reduced can be obtained even by such a high rate.

As the coating thickness of a high refractive index layer coating liquid and a low refractive index layer coating liquid, it is only necessary to coat the liquids so that the preferred dry thickness as described above will be obtained.

As a drying method, hot air drying, infrared drying or microwave drying is used. In addition, drying in a multistep process is more preferred than drying in a single process and the temperature in the constant-rate drying part<the temperature in the decreasing drying part is more preferred. In this case, the temperature range of the constant-rate drying part is preferably 30 to 60° C. and the temperature range of the decreasing drying part is preferably 50 to 100° C.

Herein, the above set means the step of decreasing the fluidity of substances between layers and in each layer or gelling the substances by increasing the viscosity of a coating film composition by, for example, a means to lower temperature by applying cold air and the like to the coating film. The state in which, when cold air is applied to a coated film from its surface and a finger is pressed against the surface of the coated film, nothing attaches to the finger, is defined as the state of set completion.

The time from coating to applying cold air and completing the set (set time) is preferably within 5 minutes and more preferably within 2 minutes. In addition, the lower limit of the time is not particularly limited and is preferably 45 seconds or more. When the set time is too short, it is feared that mixing of components in a layer will become insufficient. On the other hand, when the set time is too long, diffusion of metal oxide particles between layers proceeds, and it is feared that a difference in refractive index between a high refractive index layer and a low refractive index layer will become insufficient.

[Water-Soluble Resin]

In the present invention, the water-soluble resins used for a high refractive index layer and a low refractive index layer are not particularly limited and include polyvinyl alcohols.

Polyvinyl alcohols contain modified polyvinyl alcohol such as cationic modified polyvinyl alcohol which is modified by a cation, anionic modified polyvinyl alcohol having an anionic group like a carboxyl group, nonionic modified polyvinyl alcohol having a nonionic group, silyl-modified polyvinyl alcohol having a silyl group, along with usual polyvinyl alcohol obtained by hydrolyzing polyvinyl acetate.

As polyvinyl alcohol obtained by hydrolyzing polyvinyl acetate, that having an average polymerization degree of 1,000 or more is preferably used, and particularly preferably that having an average polymerization degree of 1,500 to 5,000, and more preferably that having 2,000 to 5,000 are used. This is because, when the polymerization degree of polyvinyl alcohol is 1,000 or more, cracks do not occur on a coated film and, when the polymerization degree is 5,000 or less, a coating liquid becomes stable. A coating liquid being stable means that the coating liquid is stable over time. The same applies to the rest.

In addition, that having a saponification degree of 70 to 100% is preferred and that having a saponification degree of 80 to 99.5% is more preferred in terms of solubility in water.

In the present invention, it is preferred that at least one of a high refractive index layer and a low refractive index layer include highly saponified polyvinyl alcohol with a low degree of polymerization, which has a polymerization degree of 100 to 500 and a saponification degree of 95 mol % or more, along with the above polyvinyl alcohol with an average polymerization degree of 1,000 or more. The stability of a coating liquid is improved by containing such highly saponified polyvinyl alcohol with a low degree of polymerization.

Further, at least one of a high refractive index layer and a low refractive index layer may include modified polyvinyl alcohol which is partially modified, along with usual polyvinyl alcohol obtained by hydrolyzing polyvinyl acetate, without losing the effect of the present invention. Such modified polyvinyl alcohol includes cationic modified polyvinyl alcohol, anionic modified polyvinyl alcohol, nonionic modified polyvinyl alcohol, vinyl alcohol polymers and the like.

Cationic modified polyvinyl alcohol is for example polyvinyl alcohol which has a primary to tertiary amine group and a quaternary ammonium group in the main chain or side chains of the above-mentioned polyvinyl alcohol, as described in Japanese Patent Application Laid-Open No. S61-10483, and is obtained by saponifying a copolymer of an ethylenically unsaturated monomer having a cationic group and vinyl acetate.

Examples of ethylenically unsaturated monomers having a cationic group include trimethyl-(2-acrylamide-2,2-dimethylethyl) ammonium chloride, trimethyl-(3-acrylamide-3,3-dimethylpropyl) ammonium chloride, N-vinylimidazole, N-vinyl-2-methylimidazole, N-(3-dimethylaminopropyl) methacrylamide, hydroxylethyl trimethylammonium chloride, trimethyl-(2-methacrylamidopropyl)ammonium chloride, N-(1,1-dimethyl-3-dimethylaminopropyl)acrylamide and the like. The proportion of cationic modified group-containing monomer to vinyl acetate in cationic modified polyvinyl alcohol is preferably 0.1 to 10 mol % and more preferably 0.2 to 5 mol %.

Examples of anionic modified polyvinyl alcohol include polyvinyl alcohol having an anionic group as described in Japanese Patent Application Laid-Open No. H1-206088, a copolymer of vinyl alcohol and a vinyl compound having a water-soluble group as described in Japanese Patent Application Laid-Open No. S61-237681 and Japanese Patent Application Laid-Open No. S63-307979, and modified polyvinyl alcohol having a water-soluble group as described in Japanese Patent Application Laid-Open No. H7-285265.

In addition, examples of nonionic modified polyvinyl alcohol include polyvinyl alcohol derivatives in which a polyalkylene oxide group is added to a part of vinyl alcohol as described in Japanese Patent Application Laid-Open No. H7-9758, a block copolymer of a vinyl compound having a hydrophobic group and vinyl alcohol described in Japanese Patent Application Laid-Open No. H8-25795, a silanol-modified polyvinyl alcohol having a silanol group, a reactive group-modified polyvinyl alcohol having a reactive group such as an acetoacetyl group, a carbonyl group and a carboxyl group, and the like.

These polyvinyl alcohols can be used singly or two or more polyvinyl alcohols, for example, with different polymerization degrees and different types of modification can be used in combination. In addition, commercial products can be used or synthetic products can be used as polyvinyl alcohols. Examples of commercial products include POVAL such as PVA-102, PVA-103, PVA-105, PVA-110, PVA-117, PVA-120, PVA-124, PVA-135, PVA-203, PVA-205, PVA- 210, PVA-217, PVA-220, PVA-224 and PVA-235 (manufactured by KURARAY CO., LTD.), EXCEVAL (registered trademark, manufactured by KURARAY CO., LTD.), Nichigo G-polymer (registered trademark, manufactured by The Nippon Synthetic Chemical Industry CO., LTD.) and the like.

[Additives]

To a low refractive index layer coating liquid and a high refractive index layer coating liquid according to the present invention, varieties of additives can be added as required. Additives will now be described.

<Curing Agent>

In the low refractive index layer and the high refractive index layer according to the present invention, a curing agent is preferably added. Examples of curing agents include, for example, curing agents causing a curing reaction with polyvinyl alcohol suitable as the above-mentioned water-soluble polymer. Specifically, boric acid and salts thereof are preferred. Well-known compounds other than boric acid and salts thereof can be also used, and are generally compounds having a group which can be reacted with polyvinyl alcohols, or compounds promoting a reaction of different groups in polyvinyl alcohols. These are properly selected and used. Further, specific examples of other curing agents include, for example, epoxy-based curing agents (such as diglycidyl ethyl ether, ethylene glycol diglycidyl ether, 1,4-butanediol diglycidyl ether, 1,6-diglycidyl cyclohexane, N,N-diglycidyl-4-glycidyloxy aniline, sorbitol polyglycidyl ether and glycerol polyglycidyl ether), aldehyde-based curing agents (such as formaldehyde and glyoxal), active halogen-based curing agents (such as 2,4-dichloro-4-hydroxy-1,3,5-s-triazine), active vinyl-based compounds (such as 1,3,5-trisacryloyl-hexahydro-s-triazine and bisvinylsulfonylmethyl ether), aluminum alum and the like.

Boric acid or a salt thereof means an oxygen acid having a boron atom as the central atom and a salt thereof, and specifically includes orthoboric acid, diboric acid, metaboric acid, tetraboric acid, pentaboric acid and octaboric acid and salts thereof.

Boric acid having a boron atom and salts thereof as curing agents can be used as an aqueous solution of a single compound or two or more of them can be used in combination. Particularly preferred is a mixed aqueous solution of boric acid and borax.

An aqueous solution of boric acid and an aqueous solution of borax can be a concentrated aqueous solution by mixing the two which each can be added only as a relatively diluted aqueous solution, thereby being able to concentrate a coating liquid. In addition, there is an advantage in being able to relatively freely control the pH of an aqueous solution to be added.

In the present invention, boric acid and a salt thereof and/or borax is preferably used in terms of further inhibiting interlayer mixing. When boric acid and a salt thereof and/or borax is used, metal oxide particles and OH groups in polyvinyl alcohols as a water-soluble binder resin form a hydrogen bond network, and consequently it is believed that interlayer mixing between a high refractive index layer and a low refractive index layer is inhibited, and preferred near infrared shielding characteristics are achieved. In particular, when a set coating process, in which a multilayer laminate of a high refractive index layer and a low refractive index layer is coated by a coater and the film surface temperature of the coating film is then temporarily cooled to approximately 15° C., followed by drying the film surface, is used, the effects can be more preferably expressed.

The total amount of the above-mentioned curing agent used is preferably 1 to 600 mg per g of polyvinyl alcohols, and more preferably 100 to 600 mg per g of polyvinyl alcohols.

<Other Additives>

Varieties of additives which can be added to the high refractive index layer coating liquid and the low refractive index layer coating liquid according to the present invention will be listed as follows. Examples thereof include varieties of well-known additives such as ultraviolet absorbers described in Japanese Patent Application Laid-Open No. S57-74193, Japanese Patent Application Laid-Open No. S57-87988 and Japanese Patent Application Laid-Open No. S62-261476, fading inhibitors described in Japanese Patent Application Laid-Open No. S57-74192, Japanese Patent Application Laid-Open No. S57-87989, Japanese Patent Application Laid-Open No. S60-72785, Japanese Patent Application Laid-Open No. S61-146591, Japanese Patent Application Laid-Open No. H1-95091, and Japanese Patent Application Laid-Open No. H3-13376 and the like, and varieties of anionic, cationic or nonionic surface active agents, fluorescent brightening agents described in Japanese Patent Application Laid-Open No. S59-42993, Japanese Patent Application Laid-Open No. S59-52689, Japanese Patent Application Laid-Open No. S62-280069, Japanese Patent Application Laid-Open No. S61-242871, and Japanese Patent Application Laid-Open No. H4-219266 and the like, pH adjustors such as sulfuric acid, phosphoric acid, acetic acid, citric acid, sodium hydroxide, potassium hydroxide, potassium carbonate and sodium acetate, antifoaming agents, lubricants such as diethylene glycol, antiseptic agents, mildew proofing agents, antistatic agents, matting agents, heat stabilizers, antioxidants, flame retardants, crystal nucleating agents, inorganic particles, organic particles, viscosity reducing agents, lubricant agents, infrared ray absorbers, colors and pigments, and the like.

[Substrate]

As a substrate of an infrared shielding film, various resin films can be used, and examples thereof include polyolefin films (such as polyethylene and polypropylene), polyester films (such as polyethylene terephthalate and polyethylene naphthalate), polyvinyl chloride, cellulose triacetate and the like. Preferred are polyester films. The polyester films are not particularly limited and are preferably polyester films having a dicarboxylic acid component and a diol component as main constituents and having film formability.

The dicarboxylic acid component, a main constituent, can include terephthalic acid, isophthalic acid, phthalic acid, 2,6-naphthalene dicarboxylic acid, 2,7-naphthalene dicarboxylic acid, diphenyl sulfone dicarboxylic acid, diphenylether dicarboxylic acid, diphenyl ethane dicarboxylic acid, cyclohexane dicarboxylic acid, diphenyl dicarboxylic acid, diphenyl thioether dicarboxylic acid, diphenylketone dicarboxylic acid, phenylindan dicarboxylic acid and the like. In addition, the diol component can include ethylene glycol, propylene glycol, tetramethylene glycol, 1,4-cyclohexane dimethanol, 2,2-bis(4-hydroxyphenyl)propane, 2,2-bis(4-hydroxyethoxy phenyl)propane, bis(4-hydroxyphenyl)sulfone, bisphenol fluorene dihydroxy ethyl ether, diethylene glycol, neopentyl glycol, hydroquinone, cyclohexanediol and the like. Among polyesters having these compounds as main constituents, preferred are polyesters having, as main constituents, terephthalic acid and 2,6-naphthalene dicarboxylic acid as the dicarboxylic acid component and ethylene glycol and 1,4-cyclohexane dimethanol as the diol component in terms of transparency, mechanical strength, dimensional stability and the like. Among these, preferred are a polyester having polyethylene terephthalate and polyethylene naphthalate as main constituents, a copolymerized polyester including terephthalic acid, 2,6-naphthalene dicarboxylic acid and ethylene glycol, and a polyester having a mixture of two or more of these polyesters as a main constituent.

The thickness of a film substrate used in the present invention is preferably 10 to 300 µm, and more preferably 20 to 150 µm. In addition, a substrate can be a substrate in which two substrates are laminated, and in this case, the kinds thereof can be the same or different.

In the substrate according to the present invention, the transmittance in the visible light region shown by JIS R3106:1998 is preferably 85% or more, and more preferably 90% or more. Such transmittance range is advantageous in that, when an infrared shielding film is formed, the transmittance in the visible light region shown by JIS R3106:1998 is 40% or more, which is preferred.

The substrate according to the present invention can be manufactured by a conventionally well-known and general method. For example, a substantially formless, non-oriented and unstretched substrate can be manufactured by melting a resin, which is a material, with an extruder, extruding it through an annular die or a T die and cooling it rapidly. In addition, a stretched support can be manufactured by stretching an unstretched substrate in the current direction (vertical axis) of the substrate or the direction perpendicular to the current direction (horizontal axis) of the substrate by a well-known method such as uniaxial stretching, tenter type sequential biaxial stretching, tenter type simultaneous biaxial stretching, or tubular simultaneous biaxial stretching. In this case, the stretching ratio can be properly selected according to a resin, which is a material for a substrate, and is preferably 2 to 10 times in each direction of vertical axis direction and horizontal axis direction.

The substrate, as mentioned above, can be an unstretched film or a stretched film, and is preferably a stretched film in terms of improvement in strength, suppression of thermal expansion and the like.

In addition, relaxation treatment and off-line heat treatment can be carried out to the substrate according to the present invention in terms of dimensional stability. The relaxation treatment is preferably carried out from heat fixation in the step of stretching film formation of the above polyester film to the windup step in a tentering machine for horizontal stretching, or to the windup step after the polyester film leaving the tentering machine. The relaxation treatment is preferably carried out at a treatment temperature of 80 to 200° C. and is more preferably carried out at 100 to 180° C. The treatment is preferably carried out in the relaxation rate range of 0.1 to 10% in both the longitudinal direction and width direction, and more preferably at a relaxation rate of 2 to 6%. In the support which is subjected to the relaxation treatment, by carrying out the above-mentioned off-line heat treatment, its thermal resistance is improved and dimensional stability becomes good.

An undercoat layer coating liquid is preferably coated on one side or both sides of the substrate according to the present invention in the film formation process by in-line coating. In the present invention, base coating in the film formation step is referred to as an in-line base. The resins used in an undercoat layer coating liquid useful in the present invention can include polyester resin, acrylic modified polyester resin, polyurethane resin, acrylic resin, vinyl resin, polyvinylidene chloride resin, polyethylene imine resin, polyethylene imine resin, polyvinyl alcohol resin, modified polyvinyl alcohol resin or gelatin or the like. These can be used singly or two or more resins can be used in combination. Conventionally well-known additives can be also added to the undercoat layer. The above-mentioned undercoat layer can be coated by a well-known method such as roll coating, gravure coating, knife coating, dip coating or spray coating. The amount to be coated onto the above-mentioned undercoat layer is preferably approximately 0.01 to 2 g/m² (dry state).

[Infrared Shielding Body]

The infrared shielding film according to the present invention can be applied to a wide range of fields, and, for example, is used as a film for bonding to a window glass such as a heat-reflecting film which imparts the heat-reflecting effect by lamination to equipment exposed to the sun light for a long period of time, such as the outside windows of a building and car windows, a film for an agricultural vinyl house and the like, mainly for the purpose of increasing weather resistance. The film is also suitably used as an infrared shielding film for cars which is inserted between a glass and a glass, such as a laminated glass for cars. In this case, an infrared shielding film can be blocked from the outside gas, which is preferred in terms of durability.

In particular, the infrared shielding film according to the present invention is suitably used for a member in which the infrared shielding film is bonded on a base body such as a glass or a glass-substituted resin directly or via a bonding agent. That in which the above infrared shielding film and the above base body are bonded together is referred to as an infrared shielding body.

Specific examples of the above base body include, for example, a glass, polycarbonate resin, polysulfone resin, acrylic resin, polyolefin resin, polyether resin, polyester resin, polyamide resin, polysulfide resin, unsaturated polyester resin, epoxy resin, melamine resin, phenol resin, diallylphthalate resin, polyimide resin, urethane resin, polyvinyl acetate resin, polyvinyl alcohol resin, styrene resin, vinyl chloride resin, a metallic plate, ceramics and the like. The kind of resin can be any of thermoplastic resin, thermosetting resin and ionizing radiation curable resin, and these resins can be used singly or two or more resins can be used in combination. The base body which can be used in the present invention can be manufactured by a well-known method such as extrusion molding, calendaring molding, injection molding, blow molding or compression molding. The thickness of a base body is not particularly limited and is commonly 0.1 mm to 5 cm.

An adhesive layer which laminates the infrared shielding film according to the present invention and a base body is preferably placed so that the infrared shielding film will be on the incident surface side of sunlight (heat ray). In addition, when the infrared shielding film according to the present invention is sandwiched between a window glass and a base body, the film can be blocked from ambient gas such as moisture and durability is excellent, which is preferred. Even when the infrared shielding film according to the present invention is placed outdoors and on the outer side of a car (for outside use), the film has environmental resistance, which is preferred.

In order to bond the infrared shielding film according to the present invention and a base body, a bonding agent can be used. As this bonding agent, a bonding agent having photo-curable or thermosetting resin as a main component can be used.

The bonding agent is preferably a bonding agent which has durability against ultraviolet rays, and is preferably an acrylic bonding agent or a silicone bonding agent. Further, an acrylic bonding agent is preferred in terms of bonding characteristics and costs. In particular, because peel strength is easily controlled, a solvent bonding agent in the acrylic bonding agent is preferred. When a solution polymerization polymer is used as an acrylic solvent bonding agent, as its monomer, a well-known monomer can be used.

In addition, as the above-mentioned bonding layer or adhesive layer, polyvinyl butyral resin or ethylene-vinyl acetate copolymer resin used as an intermediate layer of a laminated glass can be used. Specific examples thereof are, for example, plastic polyvinyl butyral (manufactured by SEKISUI CHEMICAL CO., LTD., manufactured by Mitsubishi Monsanto Chemical etc.), ethylene-vinyl acetate copolymers (manufactured by Du Pont, manufactured by Takeda Pharmaceutical Company Limited, and manufactured by DUMIRAN), modified ethylene-vinyl acetate copolymers (Melthene G manufactured by TOSOH CORPORATION) and the like. An ultraviolet absorber, an antioxidant, an antistatic agent, a heat stabilizer, a lubricant agent, filler, a coloring agent, a bonding (adhesive) adjustor and the like can be suitably added to a bonding layer or an adhesive layer.

Preferred base bodies are a plastic base body, a metallic base body, a ceramic base body, a fabric base body and the like, and the infrared shielding film of the present invention can be provided on a base body in various forms such as film, plate, sphere, cube and cuboid. Among these, a ceramic base body in the form of plate is preferred, and an infrared shielding body in which the infrared shielding film of the present invention is provided on a glass plate is more preferred. Examples of glass plates include, for example, a float plate glass described in JIS R3202:1996, and a polished plate glass, and the glass thickness is preferably 0.01 mm to 20 mm.

As a method for providing the infrared shielding film of the present invention on a base body, a method, in which an adhesive layer is painted on an infrared shielding film as described above and the film is pasted on a base body via an adhesive layer or a bonding layer, is suitably used. As a bonding method, dry bonding method by which a film is directly put on a base body, and a method of wet bonding method as described above, and the like can be adapted, and in order that air will not be entered into between a base body and an infrared shielding film, the wet bonding method is preferred in terms of easy construction such as positioning of an infrared shielding film on a base body.

In addition, the infrared shielding body according to the present invention can be for example in the form in which infrared shielding films are provided on both sides of a glass, and the form of a laminated glass in which adhesive layers or bonding layers are painted on both sides of an infrared shielding film and glasses are bonded on both sides of the infrared shielding film.

The thermal insulation performance and solar heat shielding performance of an infrared shielding film or an infrared shielding body can be generally obtained by methods according to JIS R3209:1998 (double-glazed glass), JIS R3106:1998 (test methods for transmittance, reflectance, emissivity and solar heat gain rate of plate glasses), and JIS R3107:1998 (method for calculating thermal resistance of plate glasses and a heat transmission coefficient in a building).

As the measurement of solar transmittance, solar reflectance, emissivity and visible-light transmittance, (1) using a spectrophotometer with a wavelength of 300 to 2500 nm, spectral transmittance and spectral reflectance of varieties of single-plate glasses are measured. In addition, emissivity is measured using a spectrometer with a wavelength of 5.5 to 50 μm. As the emissivity of float plate glass, polished plate glass, patterned glass and heat absorbing plate glass, their default values are used. (2) As the calculation of solar transmittance, solar reflectance, solar absorptance and corrected emissivity, solar transmittance, solar reflectance, solar absorptance and vertical emissivity are calculated according to JIS R3106:1998. The corrected emissivity is obtained by multiplying vertical emissivity by a coefficient shown in JIS R3107:1998. As the calculation of thermal insulation properties and solar heat shielding properties, (1) the thermal resistance of a double-glazed glass is calculated using the measured value of thickness and corrected emissivity according to JIS R3209:1998. However, when the thickness of a hollow layer is above 2 mm, gas thermal conductance of the hollow layer is obtained according to JIS R3107:1998. (2) The thermal insulation properties are obtained using heat transmission resistance by adding heat transfer resistance to thermal resistance of a double-glazed glass. (3) The solar heat shielding properties are calculated by obtaining a solar heat gain rate according to JIS R3106:1998 and subtracting the obtained value from 1.

EXAMPLES

The present invention will now be described in more detail byway of examples thereof. The present invention is not limited to these examples. In the examples, the expression of "parts" or "%" is used. Unless otherwise specified, it represents "parts by mass" or "% by mass".

[Preparation of Coating Liquid]

(Preparation of silica-coated titanium dioxide sol) To 0.5 parts by mass of a 15.0% by mass titanium oxide sol (SRD-W, volume average particle diameter 5 nm, rutile type titanium dioxide particles, manufactured by Sakai Chemical Industry Co., Ltd.), 2 parts by mass of pure water was added and the obtained mixture was then heated to 90° C. Next, 1.3 parts by mass of an aqueous solution of silicic acid (in which No. 4 sodium silicate (manufactured by Nippon Chemical Industrial CO., LTD.) is diluted with pure water so that the concentration of $SiO_2$ will be 2.0% by mass) was gradually added thereto. Next, the obtained mixture was subjected to heating treatment at 175° C. for 18 hours in an autoclave, and cooled and then concentrated with an ultrafiltration membrane to obtain a titanium dioxide sol, whose surface is coated with $SiO_2$, with a solid content concentration of 20% by mass (hereinafter, simply referred to as "silica-coated titanium dioxide sol").

(Preparation of High Refractive Index Layer Coating Liquid A)

To 30 parts by mass of the silica-coated titanium dioxide sol obtained above (solid content 20.0% by mass), 30 parts by mass of a 4% by mass aqueous solution of polyvinyl alcohol (PVA-135, manufactured by KURARAY CO., LTD.), 8.8 parts by mass of a 3% by mass aqueous solution of boric acid, 82 parts by mass of pure water and 10 parts by mass of a 2% by mass aqueous solution of citric acid each were added. The obtained mixture was then heated to 45° C., and 0.75 parts by mass of SN DISPERSANT 5020 (manufactured by SAN NOPCO LIMITED, 40%) was added thereto while stirring to prepare a high refractive index layer coating liquid A.

(Preparation of High Refractive Index Layer Coating Liquid B)

To 30 parts by mass of the silica-coated titanium dioxide sol obtained above (solid content 20.0% by mass), 30 parts by mass of a 4% by mass aqueous solution of polyvinyl alcohol (PVA-124, manufactured by KURARAY CO., LTD.), 8.8 parts by mass of a 3% by mass aqueous solution of boric acid, 82 parts by mass of pure water and 10 parts by mass of a 2% by mass aqueous solution of citric acid each were added. The obtained mixture was then heated to 45° C., and 0.43 parts by mass of SN DISPERSANT 5020 (manufactured by SAN NOPCO LIMITED, 70%) was added thereto while stirring to prepare a high refractive index layer coating liquid B.

(Preparation of High Refractive Index Layer Coating Liquid C)

To 30 parts by mass of the silica-coated titanium dioxide sol obtained above (solid content 20.0% by mass), 30 parts by mass of a 4% by mass aqueous solution of polyvinyl alcohol (PVA-135, manufactured by KURARAY CO., LTD.), 8.8 parts by mass of a 3% by mass aqueous solution of boric acid, 82 parts by mass of pure water and 10 parts by mass of a 2% by mass aqueous solution of citric acid each were added. The obtained mixture was then heated to 45° C., and 0.43 parts by mass of SN DISPERSANT 5020 (manufactured by SAN NOPCO LIMITED, 40%) was added thereto while stirring to prepare a high refractive index layer coating liquid C.

(Preparation of High Refractive Index Layer Coating Liquid D)

To 30 parts by mass of the silica-coated titanium dioxide sol obtained above (solid content 20.0% by mass), 30 parts by mass of a 4% by mass aqueous solution of polyvinyl alcohol (PVA-124, manufactured by KURARAY CO., LTD.), 8.8 parts by mass of a 3% by mass aqueous solution of boric acid, 82 parts by mass of pure water and 10 parts by mass of a 2% by mass aqueous solution of citric acid each were added. The obtained mixture was then heated to 45° C., and 0.75 parts by mass of SN DISPERSANT 5020 (manufactured by SAN NOPCO LIMITED, 70%) was added thereto while stirring to prepare a high refractive index layer coating liquid D.

(Preparation of High Refractive Index Layer Coating Liquid E)

To 40 parts by mass of the silica-coated titanium dioxide sol obtained above (solid content 20.0% by mass), 30 parts by mass of a 4% by mass aqueous solution of polyvinyl alcohol (PVA-135, manufactured by KURARAY CO., LTD.), 8.8 parts by mass of a 3% by mass aqueous solution of boric acid, 82 parts by mass of pure water and 10 parts by mass of a 2% by mass aqueous solution of citric acid each were added. The obtained mixture was then heated to 45° C., and 0.43 parts by mass of SN DISPERSANT 5020 (manufactured by SAN NOPCO LIMITED, 40%) was added thereto while stirring to prepare a high refractive index layer coating liquid E.

(Preparation of Low Refractive Index Layer Coating Liquid F)

To 60 parts by mass of colloidal silica (SNOWTEX (registered trademark) OXS, manufactured by Nissan Chemical Industries, LTD., solid content 10% by mass), 30 parts by mass of a 4% by mass aqueous solution of polyvinyl alcohol (PVA-224, manufactured by KURARAY CO., LTD.), 8.8 parts by mass of a 3% by mass aqueous solution of boric acid, 52 parts by mass of pure water and 2 parts by mass of a 10% by mass solution of AF-17 (manufactured by JAPAN VAM & POVAL CO., LTD., carboxyl group modification) each were added. The obtained mixture was then heated to 45° C. and stirred to prepare a low refractive index layer coating liquid F.

(Preparation of Low Refractive Index Layer Coating Liquid G)

To 60 parts by mass of colloidal silica (SNOWTEX (registered trademark) OXS, manufactured by Nissan Chemical Industries, LTD., solid content 10% by mass), 30 parts by mass of a 4% by mass aqueous solution of polyvinyl alcohol (PVA-235, manufactured by KURARAY CO., LTD.), 8.8 parts by mass of a 3% by mass aqueous solution of boric acid, 52 parts by mass of pure water and 2 parts by mass of a 10% by mass solution of AF-17 (manufactured by JAPAN VAM & POVAL CO., LTD., carboxyl group modification) each were added, and 0.1 parts by mass of a 0.74% by mass aqueous solution of sodium acetate was then added thereto. The obtained mixture was heated to 45° C. and stirred to prepare a low refractive index layer coating liquid G.

(Preparation of Low Refractive Index Layer Coating Liquid H)

To 60 parts by mass of colloidal silica (SNOWTEX (registered trademark) OXS, manufactured by Nissan Chemical Industries, LTD., solid content 10% by mass), 30 parts by mass of a 4% by mass aqueous solution of polyvinyl alcohol (PVA-224, manufactured by KURARAY CO., LTD.), 8.8 parts by mass of a 3% by mass aqueous solution of boric acid, 22 parts by mass of pure water and 2 parts by mass of a 10% by mass solution of AF-17 (manufactured by JAPAN VAM & POVAL CO., LTD., carboxyl group modification) each were added. The obtained mixture was then heated to 45° C. and stirred to prepare a low refractive index layer coating liquid H.

(Preparation of Low Refractive Index Layer Coating Liquid I)

To 60 parts by mass of colloidal silica (SNOWTEX (registered trademark) OXS, manufactured by Nissan Chemical Industries, LTD., solid content 10% by mass), 30 parts by mass of a 4% by mass aqueous solution of polyvinyl alcohol (PVA-245, manufactured by KURARAY CO., LTD.), 8.8 parts by mass of a 3% by mass aqueous solution of boric acid, 32 parts by mass of pure water and 2 parts by mass of a 10% by mass solution of AF-17 (manufactured by JAPAN VAM & POVAL CO., LTD., carboxyl group modification) each were added. The obtained mixture was then heated to 45° C. and stirred to prepare a low refractive index layer coating liquid I.

(Preparation of Low Refractive Index Layer Coating Liquid J)

To 60 parts by mass of colloidal silica (SNOWTEX (registered trademark) OXS, manufactured by Nissan Chemical Industries, LTD., solid content 10% by mass), 30 parts by mass of a 4% by mass aqueous solution of polyvinyl alcohol (PVA-235, manufactured by KURARAY CO., LTD.), 8.8 parts by mass of a 3% by mass aqueous solution of boric acid, 32 parts by mass of pure water and 3 parts by mass of a 10% by mass solution of AF-17 (manufactured by JAPAN VAM & POVAL CO., LTD., carboxyl group modification) each were added. The obtained mixture was then heated to 45° C. and stirred to prepare a low refractive index layer coating liquid J.

(Preparation of Low Refractive Index Layer Coating Liquid K)

To 60 parts by mass of colloidal silica (SNOWTEX (registered trademark) OXS, manufactured by Nissan Chemical Industries, LTD., solid content 10% by mass), 30 parts by mass of a 4% by mass aqueous solution of polyvinyl alcohol (PVA-217, manufactured by KURARAY CO., LTD.), 8.8 parts by mass of a 3% by mass aqueous solution of boric acid, 32 parts by mass of pure water and 3 parts by mass of a 10% by mass solution of AF-17 (manufactured by JAPAN VAM & POVAL CO., LTD., carboxyl group modification) each were added, and 0.1 parts by mass of a 0.74% by mass aqueous solution of sodium acetate was then added thereto. The obtained mixture was heated to 45° C. and stirred to prepare a low refractive index layer coating liquid J.

The viscosity of each prepared coating liquid and the refractive index of each coating liquid in a single layer were measured. The results are shown in Table 1 given below. The viscosity and the refractive index were measured as described below.

(Viscosity Measurement)

The viscosity of each coating liquid at 45° C. was measured using a rotational viscometer REOSTRESS6000 (manufactured by HAAKE). Specifically, while increasing the shear rate from 0 sec$^{-1}$ to 10000 sec$^{-1}$, the viscosity flow curve of a coating liquid was measured. The viscosity A at a shear rate of 10 sec$^{-1}$, the viscosity B at a shear rate of 1000 sec$^{-1}$, the viscosity C at a shear rate of 10000 sec$^{-1}$ and the viscosity at a shear rate of 100 sec$^{-1}$ were measured and further A/B and B/C were obtained.

(Measurement of Refractive Index in Single Layer)

On a substrate, each of target layers (a high refractive index layer and a low refractive index layer), whose refractive index is to be measured, was painted in the state of a single layer to produce a sample. The refractive index of a high refractive index layer and a low refractive index layer was obtained according to the following method.

Using U-4000 model (manufactured by Hitachi, Ltd.) as a spectrophotometer, the back of the measuring side of each sample was subjected to roughening and then subjected to light absorption treatment with a black spray to prevent light reflection on the back. The reflectance in the visible light region (400 nm to 700 nm) was measured under conditions of 5° specular reflection. Using the measurement results, the refractive index was obtained.

The refractive index of each layer was measured according to the above-mentioned method. Consequently, even in a laminated structure in which a high refractive index layer and a low refractive index layer are laminated, the refractive index of each layer depends on its materials and is an almost inherent value. Therefore, a difference in refractive index between a high refractive index layer and a low refractive index layer was confirmed to be 0.1 or more in all cases.

TABLE 1

| | | REFRACTIVE INDEX | A (mPa · s) | B (mPa · s) | C (mPa · s) | A/B | B/C | VISCOSITY AT SHEAR RATE OF 100 sec$^{-1}$ (mPa · s) |
|---|---|---|---|---|---|---|---|---|
| COATING LIQUID A | HIGH REFRACTIVE INDEX LAYER | 1.9 | 32.4 | 21.6 | 21.6 | 1.5 | 1 | 23.4 |
| COATING LIQUID B | HIGH REFRACTIVE INDEX LAYER | 1.9 | 98.4 | 12.3 | 12.3 | 8 | 1 | 19 |
| COATING LIQUID C | HIGH REFRACTIVE INDEX LAYER | 1.9 | 102 | 20.4 | 15.7 | 5 | 1.3 | 24.1 |
| COATING LIQUID D | HIGH REFRACTIVE INDEX LAYER | 1.9 | 17.03 | 13.1 | 13.1 | 1.3 | 1 | 14 |
| COATING LIQUID E | HIGH REFRACTIVE INDEX LAYER | 1.95 | 190 | 19 | 19.0 | 10 | 1 | 23 |
| COATING LIQUID F | LOW REFRACTIVE INDEX LAYER | 1.45 | 75.5 | 15.1 | 15.1 | 5 | 1 | 17 |
| COATING LIQUID G | LOW REFRACTIVE INDEX LAYER | 1.45 | 101 | 20.2 | 33.7 | 5 | 0.6 | 22.3 |
| COATING LIQUID H | LOW REFRACTIVE INDEX LAYER | 1.45 | 112 | 14 | 7.0 | 8 | 2 | 18 |
| COATING LIQUID I | LOW REFRACTIVE INDEX LAYER | 1.45 | 181 | 36.2 | 22.6 | 5 | 1.6 | 40 |
| COATING LIQUID J | LOW REFRACTIVE INDEX LAYER | 1.45 | 164 | 16.4 | 10.3 | 10 | 1.6 | 21 |
| COATING LIQUID K | LOW REFRACTIVE INDEX LAYER | 1.45 | 17.29 | 13.3 | 26.6 | 1.3 | 0.5 | 14.7 |

Example 1

Production of Infrared Shielding Film

Using a slide hopper coating device by which 9 layers can be coated alternately, with the temperature of the high refractive index layer coating liquid A and the low refractive index layer coating liquid F maintained at 45° C., simultaneous multilayer coating of 9 layers in total was carried out alternately on a polyethylene terephthalate (PET) film with a thickness of 50 μm heated to 45° C. (COSMOSHINE (registered trademark) A4300 manufactured by TOYOBO CO., LTD., a double-sided easy-bonding layer) at a coating rate of 10 m/min so that the average dry film thickness would be 150 nm in each low refractive index layer and 150 nm in each high refractive index layer. At this time, in order to be, from the substrate side, the first layer (undermost layer), the second layer, the third layer, the fourth layer, the fifth layer, the sixth layer, the seventh layer, the eighth layer and the ninth layer, coating liquids were sent to the slide hopper coating device by pressurizing solution-sending tanks. A flow rate was confirmed by a flowmeter (FD-SS2A manufactured by KEYENCE CORPORATION) placed between the solution-sending tanks and the slide hopper coating device. Almost no changes in the flow rate were confirmed in solution sending channels for the first layer to the ninth layer (below the average flow rate±1%). In addition, the slide hopper coating device was used so that the film thickness of the ninth layer becomes nonuniform. The slide hopper has the slit coater for the ninth layer, which has slots formed thereon with a width of 0.1 mm and a depth of 0.1 mm at a pitch of 0.3 mm in the width direction. On the above-mentioned film after simultaneous multilayer coating of 9 layers, simultaneous multilayer coating of 9 layers was carried out twice in the same manner. At this time, the above slit coater without slots was used, and solutions were sent by pressurizing solution-sending tanks for all layers. As described above, an infrared shielding film having 27 layers in total (Sample No.: Sample 1) was produced.

Examples 2 to 4, Comparative Examples 1 to 5

Infrared shielding films (Sample No.: Samples 2 to 9) were produced in the same manner as in Example 1 except that a high refractive index layer coating liquid and a low refractive index layer coating liquid described in Table 2 given below were used.

<<Evaluation>>

The following performance evaluation was carried out about the infrared shielding films produced above (Samples 1 to 9).

(Measurement of Variation of Film Thickness)

Using an electron microscope (FE-SEM, S-5000H type, manufactured by Hitachi, Ltd.), the field number was selected so that a length of 1 cm could be observed under conditions of an accelerating voltage of 2.0 kV, and the section of each infrared shielding film produced above was observed. The image was digitized, transferred to a filing device (VIDEOBANK) connected, and stored in a MO disk. Subsequently, the contrast was adjusted by an image processor. The film thickness of each layer was measured at 1000 points, and the average value of film thickness ($\mu$) and the standard deviation of film thickness ($\tau$) were calculated. The film thickness was measured on each section along several directions (at least two directions perpendicular to each other), and the measured value in the direction with the maximum standard deviation of film thickness ($\tau$) was adopted. The variation of film thickness (V) to the average value of film thickness was obtained by the following formula 1 using the standard deviation of film thickness ($\tau$) as the range of film thickness variation.

[Math. 1]

$$V[\%]=(\sigma/\mu)\times100 \qquad \text{(formula 1)}$$

(Measurement of Near-Infrared Light Transmittance)

Using the above-mentioned spectrophotometer (using an integrating sphere, U-4000 model manufactured by Hitachi, Ltd.), the transmittance of infrared shielding film samples in the region of 300 nm to 2000 nm was measured. As near-infrared light transmittance, each transmittance was evaluated by using the value of transmittance at 1200 nm.

(Measurement of L*a*b* Value)

Using the above-mentioned spectrophotometer (using an integrating sphere, U-4000 model manufactured by Hitachi, Ltd.), the back of the measuring side of each sample was subjected to roughening and then subjected to light absorption treatment with a black spray to prevent light reflection on the back. The reflectance in the visible light region (360 nm to 740 nm) was measured under conditions of 5° specular reflection and conditions of 45° specular reflection. From this result, the L*a*b* value was obtained, and a color difference $\Delta E$ between conditions of 5° specular reflection and conditions of 45° specular reflection was calculated by the formula $\Delta E=[(\Delta a^*)^2+(\Delta b^*)^2+(\Delta L^*)^2]^{1/2}$.

The evaluation results of the variation of film thickness, the near-infrared light transmittance and the color difference are shown in Table 2.

TABLE 2

| | SAMPLE NO | COATING LIQUID | COATING LIQUID TYPE | VARIATION OF FILM THICKNESS STANDARD DEVIATION (%) | NEAR-INFRARED LIGHT TRANSMITTANCE (%) | COLOR DIFFERENCE ($\Delta E$) |
|---|---|---|---|---|---|---|
| EXAMPLE 1 | SAMPLE 1 | HIGH REFRACTIVE INDEX LAYER | A | 9 | 25 | 7 |
| | | LOW REFRACTIVE INDEX LAYER | F | | | |
| EXAMPLE 2 | SAMPLE 2 | HIGH REFRACTIVE INDEX LAYER | A | 11 | 27 | 9 |
| | | LOW REFRACTIVE INDEX LAYER | G | | | |
| EXAMPLE 3 | SAMPLE 3 | HIGH REFRACTIVE INDEX LAYER | C | 12 | 28 | 9.5 |
| | | LOW REFRACTIVE INDEX LAYER | G | | | |

TABLE 2-continued

| | SAMPLE NO | COATING LIQUID | COATING LIQUID TYPE | VARIATION OF FILM THICKNESS STANDARD DEVIATION (%) | NEAR-INFRARED LIGHT TRANSMITTANCE (%) | COLOR DIFFERENCE (ΔE) |
|---|---|---|---|---|---|---|
| EXAMPLE 4 | SAMPLE 4 | HIGH REFRACTIVE INDEX LAYER | B | 7 | 23 | 3 |
| | | LOW REFRACTIVE INDEX LAYER | F | | | |
| COMPARATIVE EXAMPLE 1 | SAMPLE 5 | HIGH REFRACTIVE INDEX LAYER | D | 24 | 32 | 15 |
| | | LOW REFRACTIVE INDEX LAYER | H | | | |
| COMPARATIVE EXAMPLE 2 | SAMPLE 6 | HIGH REFRACTIVE INDEX LAYER | D | 32 | 37 | 17 |
| | | LOW REFRACTIVE INDEX LAYER | I | | | |
| COMPARATIVE EXAMPLE 3 | SAMPLE 7 | HIGH REFRACTIVE INDEX LAYER | E | 27 | 38 | 20 |
| | | LOW REFRACTIVE INDEX LAYER | J | | | |
| COMPARATIVE EXAMPLE 4 | SAMPLE 8 | HIGH REFRACTIVE INDEX LAYER | E | 33 | 40 | 22 |
| | | LOW REFRACTIVE INDEX LAYER | I | | | |
| COMPARATIVE EXAMPLE 5 | SAMPLE 9 | HIGH REFRACTIVE INDEX LAYER | D | 23 | 30 | 15 |
| | | LOW REFRACTIVE INDEX LAYER | K | | | |

As can be seen from the results in Table 2 above, it was found that the infrared shielding films in Examples 1 to 4 manufactured using coating liquids having A/B and B/C in the range of the present invention had a low variation of film thickness and the near-infrared light transmittance and the color differences were excellent. In particular, it was found that in the infrared shielding film in Example 4, in which both the high refractive index layer coating liquid and the low refractive index layer coating liquid have a viscosity of below 20 mPa·s at a shear rate of 100 sec$^{-1}$, the variation of film thickness became lower and the near-infrared light transmittance and color difference had better results.

The present application is based on Japanese Patent Application No. 2012-114826 filed on May 18, 2012, and its disclosed content is incorporated herein by reference in its entirety.

What is claimed is:

1. A manufacturing method for a multilayer laminated film, the method comprising a step of simultaneous multi-layer coating of plural coating liquids onto a substrate at a coating rate of 10 m/min or more,
    wherein each of the plural coating liquids has A/B in a range of 1.5 to 9 and B/C in a range of 0.6 to 1.4, and
    wherein,
    A [mPa·s] stands for a viscosity of the coating liquid at a temperature of 45° C. and a shear rate of 10 sec$^{-1}$,
    B [mPa·s] stands for a viscosity of the coating liquid at a temperature of 45° C. and a shear rate of 1000 sec$^{-1}$, and
    C [mPa·s] stands for a viscosity of the coating liquid at a temperature of 45° C. and a shear rate of 10000 sec$^{-1}$.

2. The manufacturing method for a multilayer laminated film according to claim 1, wherein the at least one coating liquid of the plural coating liquids has a viscosity below 20 mPa·s at a temperature of 45° C. and a shear rate of 100 sec$^{-1}$.

* * * * *